G. KUSH.
INNER TUBE FOR AUTOMOBILE TIRES.
APPLICATION FILED MAY 7, 1914.
1,125,129.
Patented Jan. 19, 1915.
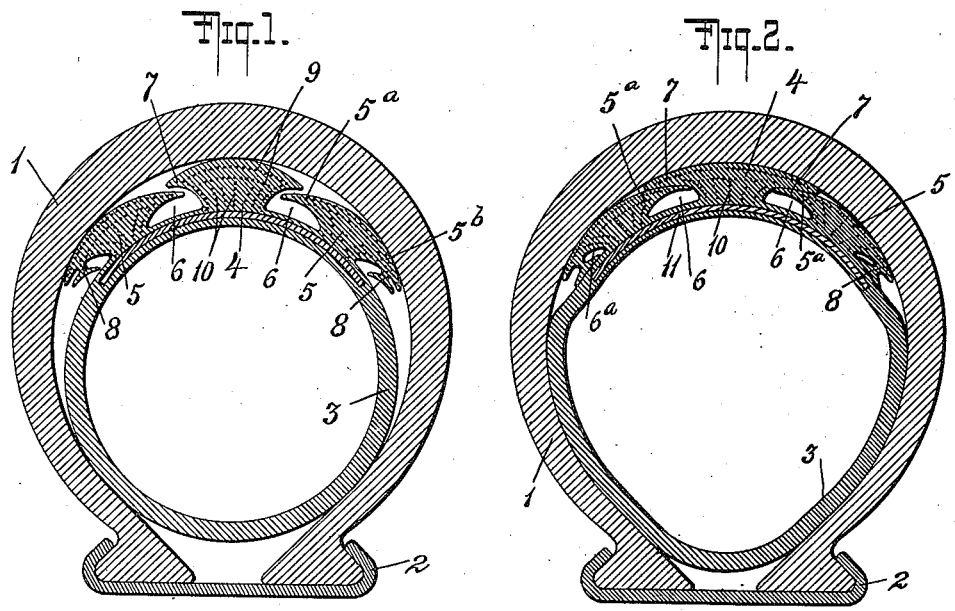
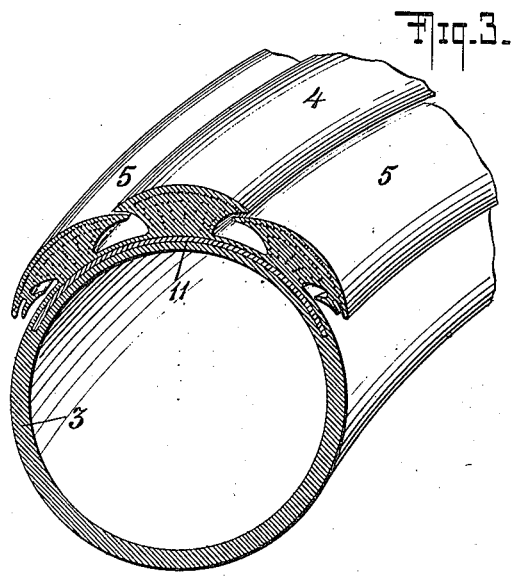
WITNESSES
George Du Bon
M. H. Lockwood
INVENTOR
GUSTAVE KUSH
BY
Briesen & Knauth
ATTORNEYS

UNITED STATES PATENT OFFICE.

GUSTAVE KUSH, OF NEW YORK, N. Y.

INNER TUBE FOR AUTOMOBILE-TIRES.

1,125,129.  Specification of Letters Patent.  Patented Jan. 19, 1915.

Application filed May 7, 1914. Serial No. 836,844.

*To all whom it may concern:*

Be it known that I, GUSTAVE KUSH, a citizen of the United States, and resident of borough of Manhattan, city, county, and State of New York, have invented certain new and useful Improvements in Inner Tubes for Automobile-Tires, of which the following is a specification.

My improvement relates more particularly to inner tubes adapted for use in tires on heavy vehicles where under the hard conditions of use the tire is apt to become overheated and collapse when the strains are heavy. The friction between the ordinary inner tube and the shoe or outer tire is frequently very great and is apt to heat and soften the inner tube so that the pressure within the tube is apt to burst the same when the wheel strikes an obstruction or under excessive working conditions.

The object of my invention is to obviate this trouble and provide an inner tube which can be used on heavy vehicles, such as touring cars and trucks, with a greater degree of satisfaction for the simple reason that bursting of the tires is practically eliminated, resulting in greater efficiency and longer life for the tire. I accomplish this by combining with the inner tube, as an integral structure, a plurality of circumferentially arranged ribs of peculiar shape having over-hanging lips or flanged edges which overlap between adjacent ribs to produce circumferential channels. The air in the channels or conduits, when the inner tube is distended, is compressed to a considerable degree thereby producing a cushion of circulating air between the outer and inner tubes. The ribs referred to are located on the outside of the tubular envelop of the inner tube, between the inner tube and the outer shoe, on the tread side thereof. This arrangement not only assists in preventing puncture of the inner tube by removing the compressed air envelop farther from the surface, but interposes a plurality of intermediate channels or conduits filled with air which can circulate circumferentially of the tire and thus prevent excessive heating of the inner tube.

It will be understood that various shapes may be designed for the ribs, but preferably the inner or middle rib or ribs have symmetrically arranged lateral flanges or lips adapted to overlap corresponding flanges on the adjacent ribs, and the outside ribs have lateral flanges provided with depending lugs adapted to contact with the smooth outer surface of the inner tube envelop when the tube is under compression as would be the case when the tire is inflated.

One form of my invention is illustrated in the accompanying drawing of which—

Figure 1 represents a cross-section of an automobile tire provided with my improved inner tube before the same is distended; Fig. 2 represents the same after the tire is inflated; Fig. 3 represents a section of the inner tube in perspective.

Referring to the drawings 1 represents the outer tire or shoe of an automobile tire of the usual or any preferred construction carried by the wheel rim 2 in any desired manner. Within the outer shoe I insert an inner tube provided with the tubular envelop 3, which in the present instance is represented as having integrally connected therewith, on the tread side thereof, a plurality of ribs 4 and 5, the envelop and ribs being made of soft rubber in the usual way. The ribs 4 and 5 are spaced apart so as to leave air channels 6 therebetween and each rib is provided with overhanging lips 7—5$^a$ which are adapted to overlap, substantially as indicated, and thus close the channels 6 so that the air therein contained will be compressed when the tire is inflated. The ribs 5, which as indicated, are the outside ribs of the series, are provided with specially constructed outer flanges 5$^b$ each having a continuous lug or rib 8 depending from the under face thereof and adapted to contact with the outer face of the envelop 3 thereby forming an additional air channel 6$^a$ for the circulation of air about the inner tube in the manner described.

It is desirable that the ribs 4 and 5 shall be capable of withstanding a considerable crushing force without collapsing or spreading out too much and for this purpose I preferably embody within the structure of the ribs a series of circumferentially arranged reinforcing strips 9 and 10 which will effectually preserve the shape of the ribs when under tension and during the operation or use of the tire. To maintain the ribs spaced apart properly and prevent the envelop 3 from being forced into the channels 6, I have preferably inserted into the body of the envelop 3 below the bases of the circumferentially arranged ribs a wide reinforcing strip 11 of fabric or other suitable material which, it will be seen, will effectually prevent stretching or elongation of the envelop in proximity to the ribs 4 and 5.

When the tire is inflated in the usual manner the pressure within the inner tube envelop 3 distends the same so as to bring it into intimate contact with the inner face of the outer tire or shoe, substantially as indicated in Fig. 2, where it will be seen that the lugs 4 and 5 with their overlapping lips will form a plurality of channels circumferentially arranged about the tire between the inner envelop and the tread side of the shoe. These channels will contain compressed air confined therein, but on account of the elasticity of the channels it will be subjected to squeezing or compressing as the tire rolls along the road, with the result that the air contained therein will be forced to circulate through the channels longitudinally or circumferentially of the tire and this circulation of the air will assist very materially in disseminating any heat generated within the tire during the operation thereof. The cellular or channel construction between the inner envelop and the outer tire will also protect the inner tube from puncture, since the soft rubber lugs and the reinforcing strips therein will tend to prevent any sharp object from entering far enough to puncture the inner envelop. From this it will be seen that my improved tire construction will result in increased efficiency of the tire and safety of operation.

Various modifications of the construction may be made, particularly as to the shape and arrangement of the ribs and channels without departing from the spirit and scope of the invention as defined in the accompanying claims.

I claim:

1. An inner tube for tires comprising a tubular envelop of pure rubber provided on the outside thereof with a plurality of longitudinally extending ribs having lateral overlapping flanges, the spaces between said ribs being adapted to form air channels, substantially as described.

2. An inner tube for tires comprising a tubular envelop of pure rubber provided with longitudinal ribs on the outside tread surface thereof, said ribs being provided with overhanging lips whereby the spaces between said ribs are adapted to form closed air channels, substantially as described.

3. In an inner tube for tires the combination with a tubular envelop of pure rubber, of integral ribs extending along the longitudinal circumference thereof, said ribs being provided with overhanging lips, and reinforcing strips of fabric within said ribs and parallel thereto.

4. In an inner tube for tires the combination with a tubular envelop of pure rubber, of integral ribs on the tread side, extending along the longitudinal circumference thereof and a reinforcing strip of fabric at the base of said ribs within the body of said envelop, said strip extending circumferentially of the tire parallel with said ribs.

5. In an inner tube for tires the combination with a tubular envelop of pure rubber, of a plurality of integral ribs on the tread side, extending along the longitudinal circumference thereof, reinforcing strips of fabric within said ribs and a reinforcing strip at the base of said ribs within the body of said envelop, said strips extending circumferentially of the tire parallel with said ribs.

6. In an automobile tire the combination with an outer shoe of an inner tube comprising a tubular envelop of pure rubber provided with a plurality of circumferentially arranged integral ribs on the tread side thereof, said ribs being spaced apart and having lateral overlapping lips, whereby, when the inner tube is distended, tubular channels or conduits are formed between the outer tire and the inner tube.

7. In an automobile tire the combination with an outer shoe, of an inner tube comprising a tubular envelop of pure rubber, provided with a plurality of circumferentially arranged integral ribs on the tread side thereof, reinforcing strips of fabric longitudinally of said ribs, and a reinforcing strip within the body of the envelop at the base of said ribs, said ribs being spaced apart and provided with overhanging lips, whereby when the inner tube is distended, circumferential tubular channels are formed between said ribs.

8. In an automobile tire the combination with an outer shoe, of an inner tube comprising a tubular envelop of pure rubber, provided with a plurality of circumferentially arranged integral ribs on the tread side thereof, the outer portions of the ribs being curved to conform to the inner curvature of the shoe, reinforcing strips of fabric within said ribs longitudinally thereof and a reinforcing strip within the body of said envelop at the base of said ribs, said ribs being spaced apart at their bases, and provided with lateral flanges or lips continuing the curved tops of the ribs, adapted to overlap between adjoining ribs, the overhanging lips of the outside ribs being provided with lugs adapted to contact with the surface of said envelop to form additional tubular air channels, substantially as described.

In testimony whereof, I have hereunto set my hand in the presence of two subscribing witnesses.

GUSTAVE KUSH.

Witnesses:
M. H. LOCKWOOD,
JOHN A. FERGUSON.